A. VANDERDONCK.
PULLEY, BRAKE, AND GRIP.
APPLICATION FILED MAR. 6, 1917. RENEWED FEB. 14, 1920.

1,345,292.  
Patented June 29, 1920.

UNITED STATES PATENT OFFICE.

ALPHONSE VANDERDONCK, OF BROOKLYN, NEW YORK.

PULLEY, BRAKE, AND GRIP.

1,345,292.    Specification of Letters Patent.    Patented June 29, 1920.

Application filed March 6, 1917, Serial No. 152,611. Renewed February 14, 1920. Serial No. 358,642.

*To all whom it may concern:*

Be it known that I, ALPHONSE VANDERDONCK, a citizen of the United States, residing at the borough of Brooklyn, in the county of Kings and State of New York, have invented certain new and useful Improvements in Pulleys, Brakes, and Grips, of which the following is a specification, reference being had therein to the accompanying drawing.

My invention relates to improvements in clutching and gripping devices and is particularly well adapted for use for retaining ropes or cables from awnings, washlines, and other structures.

Figure 1:
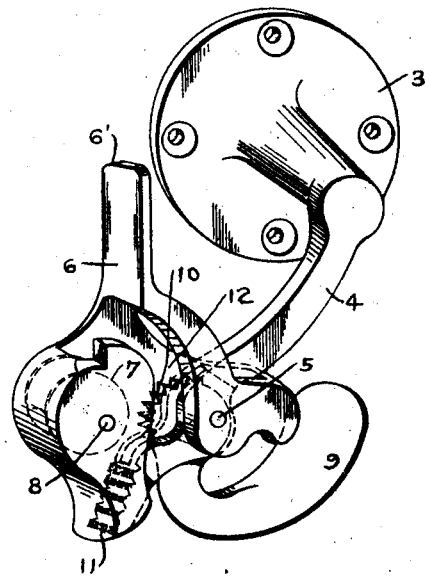
Figure 2:
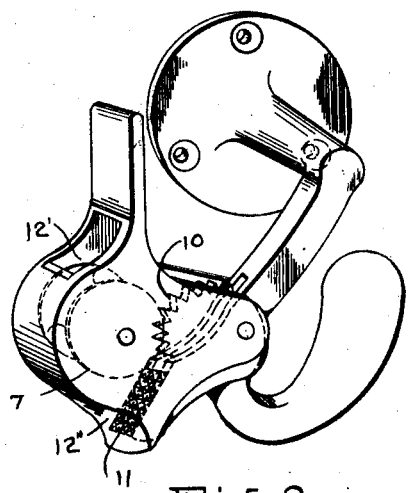

Referring to the accompanying drawings, Figure 1 illustrates an application of my invention in perspective as adapted for use for an awning or other structure, and Fig. 2 is a similar view showing a modification of the same.

3 indicates a bracket provided with an arm 4 having a pin bearing 5 in the lower end of the same upon which may be mounted the bracket 6 containing the pulley 7 upon the pin 8. 9 is a weighted member provided with an eccentric spur end 10, and 11 indicates the teeth at the end of the arm 4. The rope or cable passes through the passage 12 between the pulley 7 and the teeth 11 and pinion 10, from which it will be seen that the rope may be pulled downwardly but cannot return upwardly without being caught by the teeth 10—11, retaining the same securely against the pulley 7. By throwing the finger 6' forwardly, however, the pulley 7 is lifted sufficiently clear of the teeth 10—11 to allow the rope to slide backwardly or upwardly. From this it will be seen that the pull side of the rope is thus securely held against withdrawal as an awning is being hoisted up.

In the modification shown in Fig. 2 the cut away portion 12 is omitted and the rope enters through the opening 12' and leaves at 12", passing between the pulley 7 and teeth 10—11 as provided for in the other structure.

Of course it will be understood that various modifications may be made without departing from the spirit of the invention as claimed.

I claim:

In a device of the class described, a bracket provided with an arm having a gripping surface at one end, a pivoted pulley block thereupon having a pulley therein, said pulley block eccentrically mounted upon said arm so that a rope passing through said pulley block is retained by the gripping surface of said arm when pulled in one direction unless said pulley block is moved clear of the same, and in combination therewith a weighted member having teeth at one end eccentrically and pivotally mounted within said arm also adapted to engage said rope.

In testimony whereof I hereunto affix my signature in the presence of two witnesses.

ALPHONSE VANDERDONCK.

Witnesses:
 LOUISE ENDERLE,
 THOMAS A. HEEL.